United States Patent [19]

Sato

[11] 4,424,942
[45] Jan. 10, 1984

[54] REWIND DEVICE

[75] Inventor: Masanobu Sato, Tokyo, Japan

[73] Assignee: Olympus Optical Company Limited, Tokyo, Japan

[21] Appl. No.: 302,027

[22] Filed: Sep. 14, 1981

[30] Foreign Application Priority Data

Sep. 16, 1980 [JP] Japan .................... 55-28,386[U]

[51] Int. Cl.³ .......................... G03B 1/04; G11B 15/32
[52] U.S. Cl. .................................... 242/200; 191/12.4
[58] Field of Search ........................ 242/186, 189–192, 242/200, 201, 204; 318/6, 626, 264–268, 551; 360/74.1, 74.2; 191/12.4

[56] References Cited

U.S. PATENT DOCUMENTS 3,223,469 12/1965 Cech et al. .......................... 242/180
4,010,918 3/1977 Kato ................................... 242/191
4,215,378 7/1980 Sato et al. .......................... 360/74.1

Primary Examiner—Leonard D. Christian
Attorney, Agent, or Firm—Toren, McGeady and Stanger

[57] ABSTRACT

A rewind device for rewinding a magnetic tape provided in a cassette for a tape recorder is disclosed. The rewind device comprises an electric motor for driving an idler, pulleys rotated by the idler, reel shafts secured to the pulley and capable of rotating reels of the cassette, and a plug member connected to the motor through a switch for changing over rotating direction of the motor and capable of mating therewith a jack member which is provided to the tape recorder body and has a full remote control function.

3 Claims, 5 Drawing Figures

REWIND DEVICE

BACKGROUND OF THE INVENTION

The present invention relates to a rewind device for rewinding a magnetic tape provided in a cassette for a tape recorder.

When the tape recorder is recording it may be necessary to rewind another cassette tape in order to use it for a further recording. In this case such rewinding of the other cassette tape is carried out as soon as the recording is finished or the recording is stopped. Such action becomes very troublesome.

A rewind device exclusively for rewinding of cassette tape has been developed.

Since such conventional rewind device is arranged separately from the tape recorder a special and built-in power supply source must be provided in the rewind device so that the entire recorder becomes large and expensive.

SUMMARY OF THE INVENTION

An object of the present invention is to eliminate the above described disadvantages of a conventional rewind device.

Another object of the present invention is to provide a rewind device constructed by combining it with a tape recorder having remote control function and capable of receiving power supply through a remote control jack provided to the tape recorder so that it becomes compact and inexpensive.

According to the present invention there is provided a rewind device for rewinding a magnetic tape provided in a cassette for a tape recorder comprising an electric motor for driving an idler, pulleys rotated by the idler, reel shafts secured to the pulley and capable of rotating reels of the cassette, and a plug member connected to the motor through a switch for changing over rotating direction of the motor and capable of mating therewith a jack member which is provided to the tape recorder body and has a full remote control function.

The device further comprises means for generating stop signal at the termination of rewinding thereby to switch off the power supply from the tape recorder.

BRIEF DESCRIPTION OF THE DRAWING

These and other features and advantages of the present invention will become readily apparent from the following detailed description of one embodiment of the present invention, particularly when taken in connection with the accompanying drawings wherein like reference numerals designate like or functionally equivalent parts, and wherein.

DESCRIPTION OF THE PREFERRED EMBODIMENT

Figure 1:
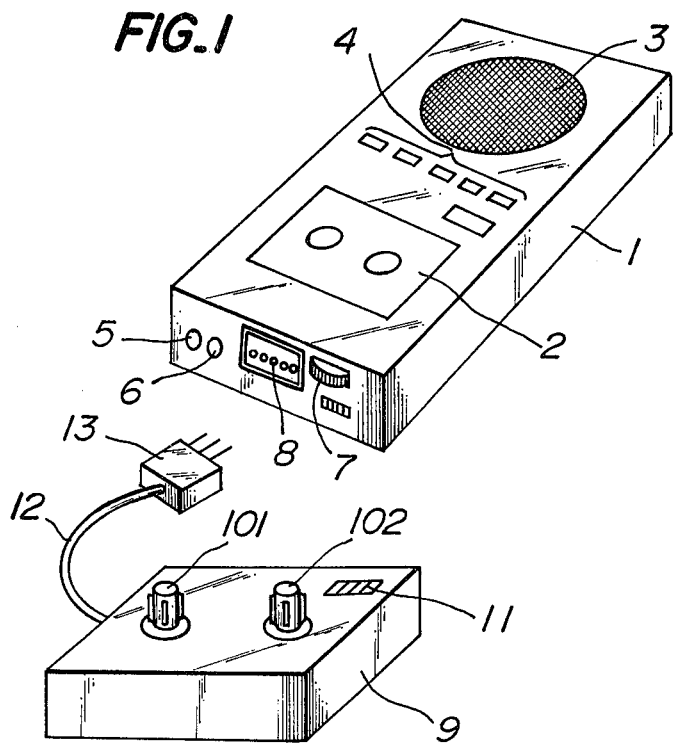
FIG. 1 is a perspective view showing one embodiment of a rewind device according to the present invention and a tape recorder related thereto.
Figure 2:
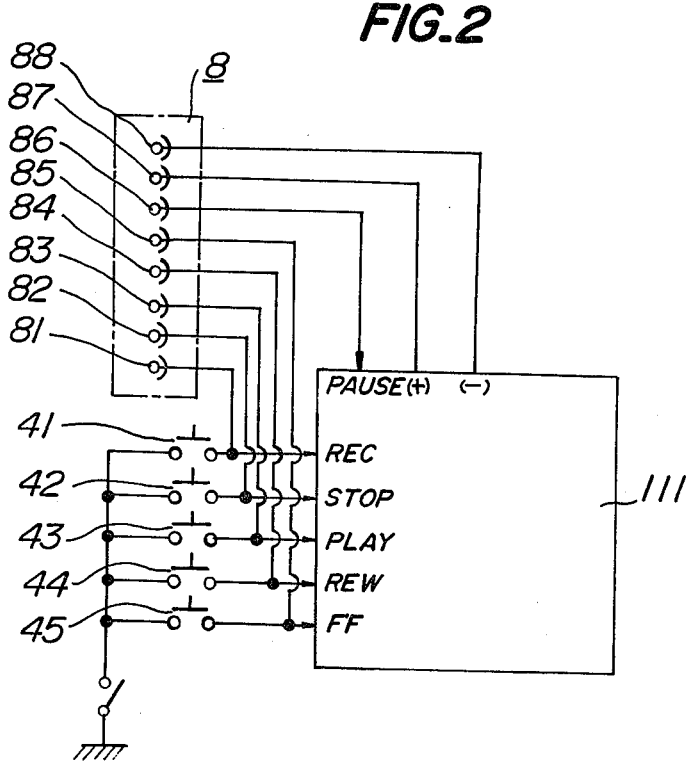
FIG. 2 is a block diagram illustrating connection arrangement of remote control jacks and function switches provided in the tape recorder shown in FIG. 1.

The drawing shown an embodiment of a rewind device according to the present invention. In FIG. 1, reference numeral 1 is a tape recorder having a full remote control function. The tape recorder 1 comprises on its front surface a cassette chamber 2 for accommodating a cassette (not shown) therein, a speaker 3 for emitting reproduced sound, a plurality of operating switches 4 for performing a plurality of functions. The tape recorder 1 also includes a microphone jack 5, an earphone jack 6, a volume control 7 and remote control jack 8 on an edge surface. In this case the operating switches 4 are connected to a tape recorder body 111 and comprise a recording (REC) switch element 41, a stop (STOP) switch element 42, a playing (PLAY) switch element 43, a rewinding (REW) switch element 44 and a fast forward (FF) switch element 45. The remote control jack 8 includes a recording (REC) jack element 81, a stop (STOP) jack element 82, a playing (PLAY) jack element 83, a rewinding (REW) jack element 84 and a fast forward (FF) jack element 85 and also comprises a pause (PAUSE) jack element 86, a power supply (+) jack element 87 and an earth (−) jack element 88. The recording jack element 81 is connected parallel to the recording switch element 41, the stop jack element 82 parallel to the stop switch element 42 in parallel, the playing jack element 83 to the playing switch element 43, the rewinding jack element 84 to the rewinding switch element 44 and the fast forward jack element 85 to the fast forward switch element 45, respectively. The pause jack element 86 is connected to the pause circuit (not shown) of the tape recorder body 111, and the power supply (+) jack element 87 and the earth (−) jack element 88 are connected to the power supply (+) terminal and the earth (−) terminal of the tape recorder body 111, respectively.

Figure 3:
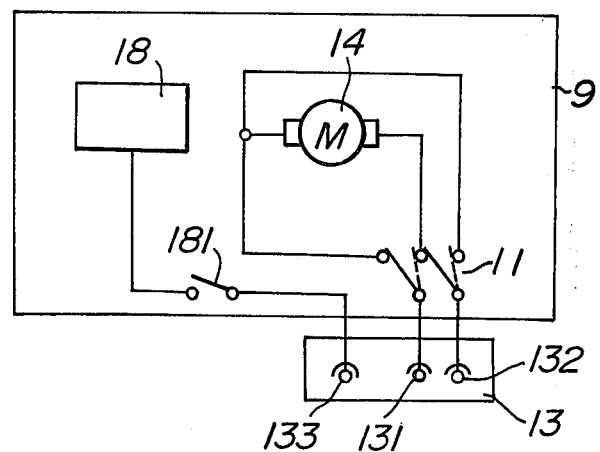
FIG. 3 is a block diagram illustrating construction of the rewind device shown in FIG. 1.
Figure 4:
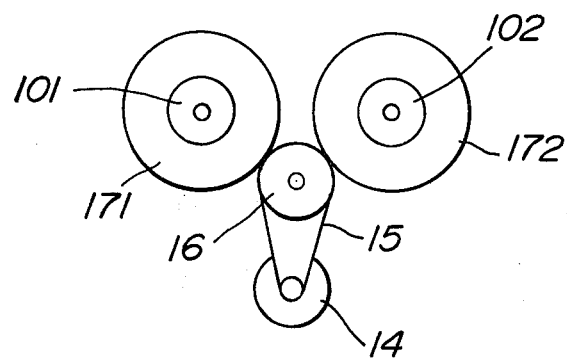
FIG. 4 is a schematic view illustrating construction of reel drive system of the rewind device shown in FIG. 3.

As shown in FIG. 1, reference numeral 9 is a rewind device according to the present invention. The rewind device 9 comprises a pair of reel shafts 101 and 102 and a winding direction change-over switch 11 as well as a plug member 13 to be inserted into the remote control jack member 8 of the tape recorder 1 through a wire cord 12 having a plurality of lead wires. In this case, as shown in FIG. 3 the plug member 13 comprises a power supply (+) plug element 131, an earth (−) or ground (−) plug element 132 and a stop (STOP) plug element 133 corresponding to the power supply jack element 87, the earth jack element 88 and the stop jack element 82 of the remote control jack member 8, respectively. The power supply plug element 131 and the earth plug element 132 are connected to an electric motor 14 through the winding direction change-over switch 11. As shown in FIG. 4 motor 14 drives an idler 16 through a belt 15 thereby to rotate a pair of reel shafts 101 and 102 through pulleys 171 and 172 in the same direction. The stop plug element 133 is connected to a rotation detector 18 through a switch 181. The rotation detector 18 serves to detect the rotation of reel shafts 101 and 102 thereby to generate a stop signal at the termination of rewinding.

Figure 5:
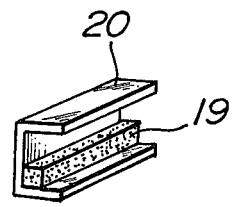
FIG. 5 is a perspective view showing construction of a detachable magnetic eraser provided in the rewind device according to the present invention.

An operation of the rewind device is explained hereinafter. A cassette tape is loaded to the reel shafts 101 and 102 of the rewind device and under this condition the plug member 13 is inserted into remote control jack member 8 of the tape recorder 1. Then, the power supply (+) jack element 87 and the earth (−) jack element 88 of the tape recorder body 111 are connected to the elements of the rewind device 9 through the remote control jack member 8 and the plug member 13 so that the motor 14 is rotated in the desired direction by the change-over operation of the switch 11 thereby to rewind the cassette tape through reel shafts 101 and 102. When the rewinding of cassette tape is finished and the rotation of reel shafts 101 and 102 is stopped the rotation detector 18 generates a stop signal. The stop signal is supplied to the stop switch element 42 of the tape recorder body 111 through the plug member 13 and the remote control jack member 8 so that the power supply to the rewind device 9 is switched off by the supply off operation of the stop switch element 42 at the tape recorder body 111. If the tape recorder body 111 operates at the predetermined mode the switch 181 is switched off. The rewind device 9 serves not only to rewind the cassette tape but also as a high speed eraser if an eraser 20 combined with a magnet segment 19 shown in FIG. 5 is arranged for the cassette tape to be rewound.

According to such construction the rewind device can receive the power supply through the remote control jack of the tape recorder so that a built-in power supply source may be omitted. This makes the rewind device compact and inexpensive. The stop signal is generated at the termination of cassette tape rewind to switch off the power supply from the tape recorder so that wasteful power consumption of battery can also be prevented. Moreover, the rewind device can serve as a high speed eraser by combining it with a simple magnetic eraser.

It is further understood by those skilled in the art that the forgoing description is a preferred embodiment of the disclosed device and the present invention is not limited thereto and that various changes and modifications may be made in the present invention without departing from the spirit and scope thereof.

What is claimed is:

1. A rewind device for rewinding a magnetic tape in a cassette for a tape recorder with a jack member comprising:

an idler, an electric motor for driving the idler, pulleys rotated by the idler, reel shafts secured to the pulleys and capable of rotating reels of the cassette, and a plug member connected to the motor, a switch between the plug member and the motor for switching the rotating direction of the motor, said plug member being arranged for receiving the jack member of the tape recorder and to energize the motor.

2. A rewind device as claimed in claim 1, wherein the device further comprises means for generating a stop signal at the termination of rewinding thereby to switch off the power supply from the tape recorder.

3. A device as in claim 2, wherein the device for generating a stop signal includes a stop signal generator and a switch in the path of the signal from the stop signal generator for disabling the stop signal.

* * * * *

UNITED STATES PATENT AND TRADEMARK OFFICE
CERTIFICATE OF CORRECTION

PATENT NO. : 4,424,942

DATED : January 10, 1984

INVENTOR(S) : Masanobu Sato, Tokyo, Japan

It is certified that error appears in the above-identified patent and that said Letters Patent is hereby corrected as shown below:

In the heading of the Patent [30] should read as follows:

[30]      Foreign Application Priority Data

Sep. 16, 1980 [JP] Japan .................. 55-128,386[U]

Signed and Sealed this

Fifteenth Day of May 1984

[SEAL]

Attest:

GERALD J. MOSSINGHOFF

Attesting Officer      Commissioner of Patents and Trademarks